United States Patent
O'Keefe et al.

(10) Patent No.: US 6,575,029 B1
(45) Date of Patent: Jun. 10, 2003

(54) GRAVITY GRADIOMETER ACCELEROMETERS

(75) Inventors: Graeme Joseph O'Keefe, Eltham (AU); James Beresford Lee, New Lambton Heights (AU); Robert John Turner, Salt Ash (AU); Gregory John Adams, Kotara (AU); Graham Clifford Goodwin, Rankin Park (AU)

(73) Assignee: The Broken Hill Proprietary Company Limited, Melbourne (AU)

( * ) Notice: Subject to any disclaimer, the term of this patent is extended or adjusted under 35 U.S.C. 154(b) by 0 days.

(21) Appl. No.: 09/415,140

(22) Filed: Oct. 5, 1999

Related U.S. Application Data

(62) Division of application No. 08/888,036, filed on Jul. 3, 1997, now Pat. No. 5,962,782.

(30) Foreign Application Priority Data

Jun. 11, 1997 (AU) .............................................. PO7319
Jun. 12, 1997 (AU) .............................................. PO7315

(51) Int. Cl.$^7$ ............................. G01V 7/00; G01P 15/11
(52) U.S. Cl. ................................... 73/382 R; 73/514.31
(58) Field of Search ........................ 73/514.16, 514.17, 73/514.18, 514.31, 514.01, 382 R, 382 G, 383

(56) References Cited

U.S. PATENT DOCUMENTS

| 4,245,510 A |   | 1/1981 | Baker |
| 4,515,013 A |   | 5/1985 | Hue |
| 4,601,206 A |   | 7/1986 | Watson |
| 5,931,285 A | * | 8/1999 | Madsen et al. .............. 198/762 |
| 6,075,754 A | * | 6/2000 | VanZandt et al. ........... 367/182 |

FOREIGN PATENT DOCUMENTS

| AU | K9943B/47 | 3/1979 |
| GB | 2088564 A | 6/1982 |
| WO | WO95/05614 A | 2/1995 |

* cited by examiner

*Primary Examiner*—Helen Kwok
(74) *Attorney, Agent, or Firm*—Olson & Hierl, Ltd.

(57) ABSTRACT

This invention concerns improvements to gravity gradient instruments (GGI) and in particular to the accelerometers that are paired within these instruments. Accelerometers have a proof mass suspended by a spring within a magnetic field. An internal feedback loop provides a signal related to movement of the proof mass back through a reaction coil retaining the proof mass in the magnetic field, to maintain the proof mass stationary. An external feedback loop adjusts the accelerometer scale factor. The internal feedback loop provides second order compensation to the proof mass and the spring stiffness. In a further aspect the invention is a method of matching accelerometer pairs.

23 Claims, 1 Drawing Sheet

GRAVITY GRADIOMETER ACCELEROMETERS

RELATED APPLICATION

This is a division of U.S. Ser. No. 08/888,036 filed Jul. 3, 1997, now U.S. Pat. No. 5,962,782 issued Oct. 5, 1999.

TECHNICAL FIELD

This invention concerns improvements to gravity gradient instruments (GGI), and in particular to the accelerometers that are paired within these instruments.

BACKGROUND ART

The GGI consists of two pairs of high quality, low noise, matched accelerometers mounted on a block. Each of the accelerometers has an internal feedback loop for proper operation, and an external feedback loop for trim adjustment of the accelerometer scale factor and alignment of the accelerometer sensitive axis.

The normal configuration has the accelerometers mounted in opposing pairs, and equally spaced around the circumference of a circle, with their sensitive axes tangential to the circle. In use the block is rotated about a spin axis which is perpendicular to the plane of the circle, and passes through the centre of the circle. The outputs of the accelerometers of each pair are differenced and the difference signals are then combined. The overall effect is that the large common mode accelerometer output signals cancel to a high degree of precision, so that the residual differences which constitute the gradient signal are observable.

The accelerometers must be matched in their pairs so that the current/acceleration transfer function is matched in amplitude and phase at all frequencies of interest, to an accuracy of 1 part in $10^{10}$. The mismatch in accelerometer pairs is a result of the difference of the internal feedback closed loop errors, and thus the mismatch is also inversely proportional to the open loop gain. The existing external feedback scale factor adjustment can degrade, by an order of magnitude, the high frequency (>1 Hz) lateral sensitivity for a 2% mismatch within the accelerometers. The influence of vertical acceleration on the accelerometers is an additional complicating factor.

SUMMARY OF THE INVENTION

The invention, as currently envisaged, is all accelerometer having a proof mass suspended by a spring within a magnetic field. An internal feedback loop provides a signal related to movement of the proof mass back through a reaction coil retaining the proof mass in the magnetic field, to maintain the proof mass stationary. An external feedback loop adjusts the accelerometer scale factor. Wherein, the internal feedback loop provides second order compensation to the proof mass and the spring stiffness.

The internal feedback path may include high gain to reduce errors in the accelerometer transfer function.

A compensator in the internal feedback loop may provide double pole and double zero compensation:

$$\frac{m_1 s^2 + k_1}{m_0 s^2 + k_0}$$

where:

$m_1$ is the mass of the proof mass
$k_1$ is the spring constant of the spring
$m_0$ is a nominal proof mass and
$k_0$ is a nominal spring constant.

The nominal proof mass and spring constant represent the accelerometer characteristics to which both accelerometers of a pair are to be matched in order that the two accelerometers are closely matched to each other.

In a GGI the compensation provided by the internal feedback loop may correct for the mass ratio (or Fo frequency ratio) mismatch between two paired accelerometers by providing the $s^2$ loop gain term as a mass compensator. The compensation may also correct for the spring ratio by providing a loop gain term which lumps together variations in pick-off gain, integrator capacitors and spring constant, as a spring stiffness k compensator.

The components of the compensation network are typically resistors and capacitors. Variable components are introduced so that the break frequencies can be tuned over a +/−5% range to match the masses m and the spring stiffnesses k of the accelerometer pairs to better than 0.5%. The closed loop gain blocks are trimmed in pairs to match the time constants to within 0.5%.

In a further aspect the invention is a method of matching accelerometer pairs, comprising the steps of:

Testing the pair of accelerometers in back to back fixtures on a horizontal shaker which is aligned to the same vertical angle as in the GGI.

Selecting the accelerometers on the basis of the best scale factor match at 0.5 Hz and the lowest lateral sensitivity at 10 Hz.

Applying horizontal excitation at 0.25 Hz, 1 Hz and 10 Hz (or higher) and detecting the system response with synchronous demodulation at the frequencies. A scale factor loop may be driven from the 0.25 Hz signal or it may be adjusted manually while the excitation is applied.

Adjusting second order mass compensation to minimise the in phase (I) and the quadrature (Q) components of the signal at 10 Hz.

Adjusting second order spring stiffness compensation to minimise the components at 1 Hz.

Iteratively repeating the adjusting steps to achieve matches better than 0.5%.

The external feedback path may provide the output signal, demodulated at the spin frequency $\Omega$ by a demodulator, to correct for mismatches in the strength B of the magnets in accelerometers. This feedback loop may also compensate for some part of the mismatches in proof mass and spring stiffness.

BRIEF DESCRIPTION OF THE DRAWINGS

An example of the invention will now be described with reference to FIG. 1 which is a schematic diagram of a modified accelerometer pair embodying the present invention.

BEST MODES FOR CARRYING OUT THE INVENTION

Figure 1:
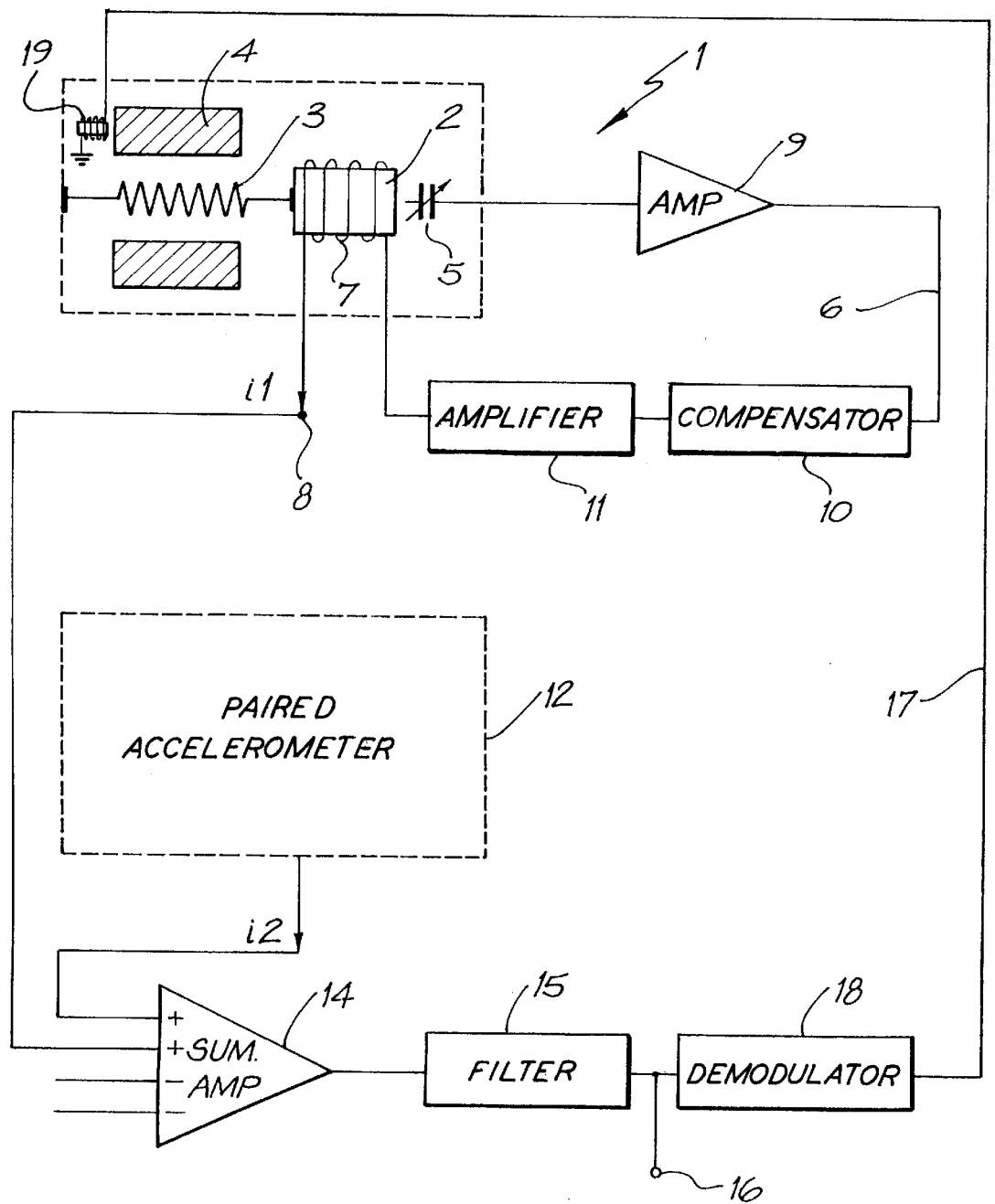

Accelerometer 1 comprises a proof mass 2 suspended by a spring 3 in a magnetic field provided by magnet 4. The proof mass 2 is associated with a position sensor 5 which provides a feedback signal through feedback loop 6 to a reaction coil 7 that retains the proof mass 2. The current i1 flowing through coil 7 is taken as an output from output port 8.

Feedback loop 6 includes a position sensor amplifier 9, a compensation network 10 and another amplifier 11 arranged in series. In use an external acceleration causes a force to be applied to the proof mass 2 within accelerometer 1. Any tendency to movement of the proof mass 2 causes a current to flow in feedback loop 6 and through coil 7. The current flowing through retaining coil 7 in the magnetic field provided by magnet 4 causes an equal and opposite force to be applied to the proof mass 2 to compensate for the tendency to movement. The current i1 flowing through the coil 7 is therefore a measure of the acceleration applied to the proof mass.

In a GGI the accelerometers are arranged in opposing pairs and the output i1 from accelerometer 1 is added to the output i2 from its paired accelerometer 12 and is combined with the output signals from the other pair of accelerometers in the GGI, in a summing amplifier 14, and the output is then filtered 15 to provide a signal to the instrument output 16.

An external feedback path 17 provides the output signal, demodulated at the spin frequency $\Omega$ by demodulator 18, to be applied to a small electromagnet 19 associated with the magnet 4. This feedback signal corrects for mismatches between the strength B of the magnet 4 in accelerometer 1 and the strength of the magnet in accelerometer 12. This feedback loop will also compensate for some part of the mismatches in proof mass m and spring stiffness k; in particular the compensation matches the real component of the of mismatch at the spin frequency, but it cannot match at any other frequency or match the imaginary component of the mismatch. Below 2 Hz the dominant parameters affecting mismatch are the spring constant k differences. Above 2 Hz the dominant parameters are the proof mass m differences. At the preferred frequency of operation, below 1 Hz, the external feedback loop can be thought of as providing dynamic correction for the magnetic field ratio B/k where B is the magnetic field strength and k is the spring stiffness.

The internal feedback path 6 includes high gains from the two amplifiers 9 and 11 to reduce errors in the accelerometer transfer function. This error reduction, as a function of frequency, is inversely proportional to the loop gain at that frequency. It follows that the mismatch in accelerometer pairs is a result of the difference of the closed loop errors.

The compensator 10 in the feedback loop 6 provides double pole and double zero compensation:

$$\frac{m_1 s^2 + k_1}{m_0 s^2 + k_0}$$

where:
$m_1$ is the mass of the proof mass
$k_1$ is the spring constant of the spring
$m_0$ is a nominal proof mass and
$k_0$ is a nominal spring constant.

This compensation corrects for the mass ratio (or Fo frequency ratio) by providing an $s^2$ loop gain term as a mass compensator. The compensation also corrects for the spring ratio by providing a loop gain term which lumps together variations in pick-off gain, integrator capacitors and spring constant, as a spring stiffness k compensator.

The components of the compensation network 10 are typically resistors and capacitors. Variable components are introduced so that the break frequencies can be turned over a +/−5% range to match the masses m and the spring stiffnesses k of the accelerometer pairs to better than 0.5%. The closed loop gain blocks are trimmed in pairs to match the time constants to within 0.5%.

The accelerometer pairs are then tested in back to back fixtures on a horizontal shaker.

The accelerometers are selected on the basis of the best scale factor match at 0.5 Hz and the lowest lateral sensitivity at 10 Hz. Horizontal excitation at 0.25 Hz, 1 Hz and 10 Hz (or higher) is input and the system response is detected with synchronous demodulation at these frequencies. A scale factor loop may be driven from the 0.25 Hz signal or it may be adjusted manually while the excitation is applied. The mass compensation is adjusted to minimise the in phase (I) and the quadrature (Q) components of the signal at 10 Hz, while the spring stiffness compensation is adjusted to minimise the components at 1 Hz. The compensations are adjusted iteratively to achieve matches better than 0.5% since there is some interaction between the parameters.

It should be appreciated that although the invention has been described with reference to a particular example it could be embodied in many other forms. For instance, alternative parameterisation is possible besides the magnetic field ratio B/k, mass ratio and spring ratio. However the compensation must provide second order correction.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

What is claimed is:

1. An accelerometer comprising
   a magnet means that produces a magnetic field;
   a proof mass that is suspended by a spring within said magnetic field and that tends to move in response to an applied acceleration force;
   position sensor means for said proof mass and for producing a position signal representative of the position of said proof mass;
   a reaction coil adjacent said proof mass and within said magnetic field;
   an internal feedback loop that receives said position signal, that provides a feedback signal related to movement tendency of said proof mass, that delivers said feedback signal to said reaction coil to maintain said proof mass stationary and that generates in said reaction coil a current signal which is representative of an acceleration force applied to said proof mass;
   an external feedback loop that receives said current signal, that may receive a second corresponding current signal from a second opposing accelerometer which is paired with said accelerometer, and that combines and processes said so received current signals, and that produces a corrective signal;
   a relatively small electromagnet means associated with said magnet means for receiving said corrective signal and for responsively adjusting said accelerometer to correct for mismatches between said accelerometer and said second accelerometer;
   thereby to adjust an acceleration scale factor and permit said internal feedback loop to provide second order compensation to said proof mass and the stiffness of said spring.

2. The accelerometer of claim 1 wherein said internal feedback loop includes means for high gain to reduce errors in the accelerometer transfer function.

3. The accelerometer of claim 1 wherein said internal feedback loop includes a compensator to provide double pole and double zero compensation as follows:

$$\frac{m_1 s^2 + k_1}{m_0 s^2 + k_0}$$

where:

$m_1$ is the mass of the proof mass, $k_1$ is the spring constant of the spring, $m_0$ is a nominal proof mass, and $k_0$ is a nominal spring constant, and the nominal mass and spring constant represent the accelerometer characteristics to which both accelerometers of a pair are to be matched in order that the two accelerometers are closely matched to each other.

4. A method of matching accelerometer pairs comprising the steps of:

testing the pair of accelerometers in back to back fixtures on a horizontal shaker which is aligned to a preselected angle;

selecting the accelerometers on the basis of a best scale factor match at 0.5 Hz and a lowest lateral sensitivity at 10 Hz;

applying horizontal excitation at a range of frequencies about 0.25 Hz, and detecting a response with synchronous demodulation at frequencies in said range;

adjusting second order mass compensation to minimize the in phase (I) and the quadrature (Q) components of a signal achieved at 10 Hz;

adjusting second order spring stiffness compensation to minimize the components at 1 Hz; and iteratively repeating the adjusting steps to achieve matches better than 0.5%.

5. The method of claim 4 wherein a scale factor loop is included that may be adjusted manually while excitation is applied.

6. The method of claim 5 wherein an external feedback loop is included that provides an output signal that is demodulated at the spin frequency Ω by a demodulator, thereby to correct for mismatches in the strength B of the magnets in the accelerometers.

7. The method according to claim 4 wherein a scale factor loop may be adjusted manually while excitation is applied.

8. The method according to claim 7 wherein an external feedback loop provides an output signal that is demodulated at a spin frequency by a demodulator, thereby to correct for mismatches between the accelerometers.

9. The method according to claim 4 in which at least one of the accelerometers comprises:

a magnet means that produces a magnetic field;

a proof mass that is suspended by a spring within said magnetic field and that tends to move in response to an applied acceleration force;

a position sensor for said proof mass and for producing a feedback signal representative of the position of said proof mass;

a reaction coil adjacent the proof mass and within said magnetic field;

an internal feedback loop that receives said feedback signal and that provides a signal related to movement of said proof mass and that delivers said signal to said reaction coil to maintain said proof mass stationary and to generate a first coil output current signal in said reaction coil that is representative of an acceleration force applied to said proof mass;

an external feedback loop for adjusting said accelerometer that receives said first coil output current signal, that may receive a second coil output current signal from a second accelerometer which opposes but matches said accelerometer, and that combines said received signals to produce an output signal;

a relatively small electromagnet means associated with said magnet means for receiving said output signal and for responsively adjusting said accelerometer to correct for mismatches between said accelerometer and said second accelerometer;

thereby providing the capacity to adjust an acceleration scale factor and permitting said internal feedback loop to provide second order compensation to said proof mass and the stiffness of said spring.

10. The compensation method according to claim 9, wherein the internal feedback loop includes high gain to reduce errors in an accelerometer transfer function.

11. A gravity gradient instrument comprising:

a first, a second, a third and a fourth accelerometer equally spaced around the circumference of a circle with their respective sensitive axes tangential to the circle and arranged in opposing pairs with the first accelerometer opposite the second accelerometer and the third accelerometer opposite the fourth accelerometer;

in use the accelerometers are spun around an axis normal to the circle and passing through the center of the circle;

said instrument further comprising an internal feedback loop for each accelerometer and an external feedback loop common to all the accelerometers to correct for mass ratio mismatch between two paired accelerometers by providing a $s^2$ loop gain as a mass compensator.

12. A gravity gradient instrument comprising:

a first, a second, a third and a fourth accelerometer equally spaced around the circumference of a circle with their respective sensitive axes tangential to the circle and arranged in opposing pairs with the first accelerometer opposite the second accelerometer and the third accelerometer opposite the fourth accelerometer;

in use the accelerometers are spun around an axis normal to the circle and passing through the center of the circle;

said instrument further comprising an internal feedback loop for each accelerometer and an external feedback loop common to all the accelerometers to correct for Fo frequency ratio mismatch between two paired accelerometers by providing a $s^2$ loop gain as a mass compensator.

13. A gravity gradient instrument comprising:

a first, a second, a third and a fourth accelerometer equally spaced around the circumference of a circle with their respective sensitive axes tangential to the circle and arranged in opposing pairs with the first accelerometer opposite the second accelerometer and the third accelerometer opposite the fourth accelerometer;

in use the accelerometers are spun around an axis normal to the circle and passing through the center of the circle;

said instrument further comprising an internal feedback loop for each accelerometer and an external feedback loop common to all the accelerometers to correct for mass ratio and the Fo frequency ratio mismatch between two paired accelerometers by providing a $s^2$ loop gain term as a mass compensator.

14. A gravity gradient instrument according to claim 13 in which one or both of the accelerometers comprises a proof mass suspended by a spring within a magnetic field, an internal feedback loop to provide a signal related to movement of the proof mass back through a reaction coil acting in the magnetic field to maintain the proof mass stationary, an external feedback loop to adjust the accelerometer scale factor, wherein, the internal feedback loop provides second order compensation to the proof mass and a spring stiffness.

15. A gravity gradient instrument according to claim 14, wherein the internal feedback loop includes high gain to reduce errors in an accelerometer transfer function.

16. A gravity gradient instrument according to claim 15, wherein there is a compensator in the internal feedback loop to provide double pole and double zero compensation as follows:

$$\frac{m_1 s^2 + k_1}{m_0 s^2 + k_0}$$

where:
- $m_1$ is the mass of the proof mass
- $k_1$ is the spring constant of the spring
- $m_0$ is a nominal proof mass and
- $k_0$ is a nominal spring constant and the nominal proof mass and spring constant represent the accelerometer characteristics to which both accelerometers of a pair are to be matched in order that the two accelerometers are closely matched to each other.

17. An accelerometer apparatus comprising
a magnet means for producing a magnetic field;
a proof mass that tends to move in response to an applied acceleration force;
a spring means for suspending and yieldingly biasing the position of said proof mass in said magnetic field;
a position sensor means for sensing the position of said proof mass and for providing a position signal representative of said proof mass position;
a reaction coil in said magnetic field adjacent said proof mass for retaining said proof mass in a substantially stationary position responsive to a compensating feedback signal received in said reaction coil;
an internal feedback loop for
receiving said position signal from said position sensor,
producing and delivering said compensating feedback signal to said reaction coil, said compensating feedback signal being representative of an acceleration force applied to said proof mass, whereby any tendency towards movement of said proof mass in said magnetic field is opposed, and
producing in said reaction coil a coil current that is representative of an acceleration force applied to said proof mass;
an external feedback loop for adjusting said accelerometer that
receives said coil current,
may receive a second coil current from a second opposing accelerometer which is paired with said accelerometer, and
combines and processes said received coil currents through a summing amplifier, a filter, and a demodulator to produce a corrective output signal; and
a relatively small electromagnet means associated with said magnet means for receiving said corrective output signal and for responsively adjusting said magnet means of said accelerometer to correct for mismatches between said accelerometer and said second accelerometer;
thereby to achieve a matching of said accelerometer and said second accelerometer.

18. The accelerometer of claim 17 wherein said reaction coil is connected to an output port for receiving and passing current flowing through said reaction coil and said output port is connected to said external feedback loop.

19. The accelerometer of claim 17 wherein said internal feedback loop includes a compensator to provide double pole and double zero compensation.

20. The accelerometer of claim 17 which is combination with a second accelerometer that opposes but matches said accelerometer, and that includes a similar combination of components and that generates a current that flows from the reaction coil of the second accelerometer, and the respective output current from each reaction coil are combined in said external feedback loop to produce an output signal that is fed to the respective electromagnet means of each said accelerometer.

21. Apparatus for producing a matched pair of accelerometers in a gravity gradient instrument, said apparatus comprising in combination:
a pair of accelerometers, each said accelerometer having its sensitive axis located perpendicularly and tangentially relative to the perimeter of a circle, and each said accelerometer being in diametrically opposed relationship relative to said circle, each said accelerometer comprising in combination:
a magnet means for producing a magnetic field;
a proof mass that tends to move in response to an applied acceleration force;
a spring means for suspending and yieldingly biasing the position of said proof mass in said magnetic field;
a position sensor means for sensing the position of said proof mass and for providing a position signal representative of said proof mass position;
a reaction coil in said magnetic field adjacent said proof mass for retaining said proof mass in a substantially stationary position responsive to a compensating feedback signal received in said reaction coil and for producing an output signal that is representative of an acceleration applied to said proof mass;
an internal feedback loop for receiving said position signal from said position sensor and for producing and delivering said compensating feedback signal to said reaction coil, said compensating feedback signal being representative of an acceleration force applied to said proof mass, whereby any tendency towards movement of said proof mass in said magnetic field is compensated; and
a relatively small electromagnet means associated with said magnet means for receiving a corrective signal, said electromagnet means being adapted to adjust said accelerometer responsive to said received corrective signal; and
an external feedback loop that is common to both of said accelerometers and that receives said output signal from said reaction coil of each said accelerometer, includes
a summing amplifier that adds together said output signal from each of said reaction coils,
a filter through which the signal from said summing amplifier passes, and
a demodulator that demodulates the signal from said filter at a predetermined spin frequency, thereby to produce said corrective signal, and
feeds said corrective signal to each said electromagnet of said accelerometers;
whereby mismatches between said accelerometers are corrected.

22. The apparatus of claim 21 wherein said internal feedback loop of each of said accelerometers includes means for producing high gain, thereby to reduce errors.

23. The accelerometer of claim 21 wherein said internal feedback loop of each said accelerometer includes a compensator to provide double pole and double zero compensation as follows:

$$\frac{m_1 s^2 + k_1}{m_0 s^2 + k_0}$$

where:
 $m_1$ is the mass of the proof mass,
 $k_1$ is the spring constant of the spring,
 $m_0$ is a nominal proof mass, and
 $k_0$ is a nominal spring constant, and the nominal proof mass and the spring constant represent accelerometer characteristics of each accelerometer of said pair in order to closely match said accelerometers to each other.

* * * * *